United States Patent Office 3,302,598
Patented Feb. 7, 1967

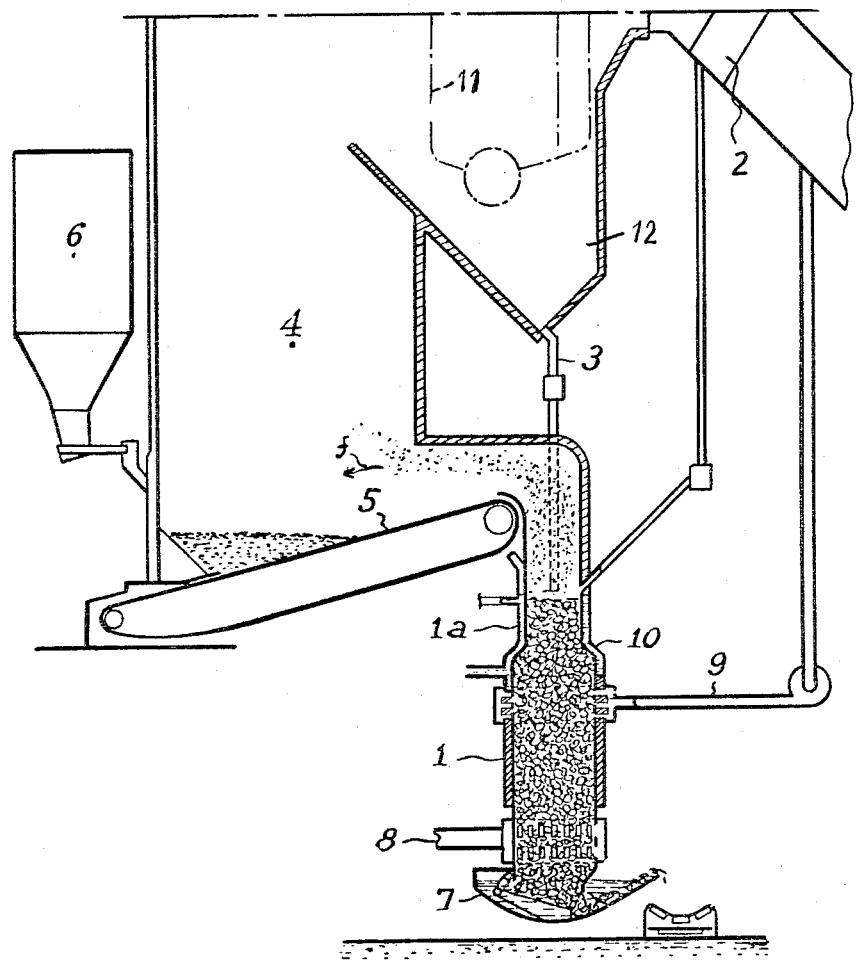

3,302,598
COMBUSTION PROCESS AND APPARATUS
Albert Godel, 66 Rue d'Auteuil, Paris, France
Filed Jan. 13, 1965, Ser. No. 425,179
Claims priority, application France, Feb. 13, 1964,
963,597
10 Claims. (Cl. 110—165)

This invention relates to a combustion process and apparatus and refers more particularly to a process and apparatus for post-combustion in furances employing solid fuel so as to attain calorific recovery of solid combustion residues.

It is a matter of general knowledge that the thermic efficiency based on net calorific value developed when heating with solid fuel is substantially less than that produced when using liquid or gaseous fuel.

This difference in efficiency, which may amount to five points or more, is caused essentially by calorific losses inherent in the solid nature of the fuel, since these losses are substantially localized in the clinkers or evacuated slags of furnaces, as well as in grit emission at the chimney. The losses are constituted by a substantial amount of sensible heat contained in the hot solid residues of combustion and by the latent heat of unburned substances contained therein.

An object of the present invention is the provision of a process and apparatus for recovering these calorific losses.

Other objects of the present invention will become apparent in the course of the following specification.

In accordance with the present invention, a main furnace of any suitable type is associated with a small auxiliary furnace constituted by the ash-pit column itself; air is blown into the base of this column so as to develop therein a post-combustion of these clinkers which emerged from the main furnace, as well as of the grit collected from the flue gas issued from the main furnace.

In accordance with the present invention, all the clinkers and grit emerging from the main furnace are dropped at the top of a vertical column formed by the ash-pit itself, constituting an auxiliary furnace and are maintained therein during a time period which is adequate to assure their complete post-combustion by the air blown into the base of this column, gases resulting from combustion in the auxiliary furnace being evacuated upwadly into the main furnace, while the burned out cooled clinkers are mechanically removed from the base of the auxiliary furnace by an extractor of known type, the operation of which is controlled so as to maintain constant the height of the column of clinkers.

By following the process of the present invention it is quite easy to produce in the column itself, i.e. without any substantial construction expenses, a lengthy time period of contact of combustion residues with air, for example, one-half hour or one hour to assure complete post-combustion of clinkers.

It should be noted that according to the invention this time period can be easily extended by increasing to any adequate size, the diameter or the height of the auxiliary furnace.

One of the important characteristic features of the present invention consists in that there is provided in the auxiliary furnace a systematic circulation of rising air in counter-current to the dropped clinkers, so as to obtain a complete post-combustion of the clinkers. The clinkers can be removed at ambient temperature from the base of the auxiliary furnace. Since the clinkers have normally an increase temperature from the bottom to the top of the auxiliary furnace, it may happen that as the result of the post-combustion, the clinkers at the top have a maximum temperature substantially greater than that which they had at the time they left the main furnace.

But it is important in order to maintain sufficient permeability in the layer of clinkers piled in the column and to assume a good penetration of air to non-combusted solids, that this temperature be limited to one below that at which the clinkers are vitrified. In accordance with the present invention this can be attained by two following procedures which can be used separately or in combination:

According to the first procedure, the amunt of air blown into the base of the auxiliary furnace consisting of the column of clinkers, is increased so that post-combustion takes place with a more or less substantial excess of air.

According to the second procedure, neutral combustion flue gas is additionally injected into the layer of clinkers, whereby this injection can take place at the base of the auxiliary furnace, or preferably, somewhat above that base, so as not to affect deterimentally the cooling of the clinkers.

Another important feature of the present invention consists in that a sufficient speed of gas is maintained at the upper part of the auxiliary furnace so as to make certain that grit ascends and is flown to the main furnace. For that purpose, according to the present invention, the section of the upper part of the column of dropped clinkers is reduced and the level of the column of clinkers is regulated at the top of this reduced part. The grit dropped under these circumstances upon the layer of clinkers is immediately heated by the emerging gas and escapes from the reduced section of the auxiliary furnace in the form of flaming cinders to reach the main furnace.

Auxiliary furnaces constructed in accordance with the present invention may be used in conjunction with all types of furnaces wherein clinkers are extracted, namely, furnaces with the conventional mechanical grate, furnaces with an inclined ascending grate, horizontal furnaces of the spreader-stoker type, furnaces with descending steps, even certain furnaces for pulverized fuel. Auxiliary furnaces may be of different shapes, namely, they can have a circular, square or rectangular cross-section.

The invention will appear more clearly from the following detailed description, when taken in connection with the accompanying drawing showing by way of example, a preferred embodiment of the inventive idea.

The sole figure of the drawing shows in section, with some parts in side view, an apparatus constructed in accordance with the present invention and combined with a main combustion furnace having an inclined grate.

The general construction is described in U.S. Patent No. 2,866,696.

The main furnace 4 shown in the drawing has an inclined grate 5 supporting a fluidized bed of granulated fuel which is supplied as small coal from a bunker 6. Thus heat is supplied to a surmounting boiler which is not shown in the drawing, except partly by its nest of tubes 11. The furnace includes a grid arrestor 2 and a bunker 12 located under the nest of tubes 11.

The apparatus of the present invention comprises a vertical auxiliary furnace 1 of rectangular cross-section which extends upwardly in the form of a narrower section 1a. Clinkers and grit from the grit arrestor 2 and the bunker conduit 3 drop into the top of the auxiliary furnace. A hydraulic piston extractor 7 of known type is located at the lower end of the auxiliary furnace 1. Above the extractor 7 a pipe 8 is provided for supplying air into the interior of the auxiliary furnace 1. The walls of the auxiliary furnace 1 have a refractory coating to prevent the clinkers from becoming attached to these walls. Some of these walls, namely, those adjacent to the upper section 1a, are cooled by a water circulating jacket 10. Obviously the jacket 10 can be replaced by a coiled pipe. The extractor 7 provides for a specific adjustable removal of the clinkers. In operation, the speed of removal of the clinkers is regulated in such manner that the clinkers are accumulated in the upper section 1a up to a certain predetermined height which is then maintained constant. Due to this arrangement, air blown in through the pipe 8 and circulating systematically while rising in counter-current through the mass of clinkers, will provide their post-combustion at the upper part of the auxiliary furnace and their complete cooling in the lower part of the auxiliary furnace. Any suitable means (not shown) may be used to regulate the amount of the blown-in air, so that this amount will be at least sufficient to provide for a methodic recovery of all calories contained in the clinkers in a sensitive and latent form. Neutral flue gases form which grit has been removed, coming from the main furnace are also blown into the column of clinkers through the pipe 9, so as to reduce the temperature of combustion. Practical experience has shown that the speed of blown-in air can be regulated in such manner that the grit introduced into the upper part of the auxiliary furnace upon the layer of clinkers, does not penetrate to any great extent into the mass of clinkers; thus grit located in the upper part of the auxiliary furnace is ignited and is blown along with the gas, so that it is reintroduced into the main furnace (as indicated by the arrow f in the drawing). The small fraction of grit which is burned in the auxiliary furnace, produces an additional combustion gas which is also introduced into the main furnace.

The following example of the process of the present invention is given by way of illustration only:

A main furnace, comprising an inclined mechanical chain-gate of 3" supporting a fluidized bed of fine anthracite coal, equips a boiler of an evaporation output of 110,000 lb./hr. with an economizer and an air preheater.

The above furnace, then provided with an auxiliary furnace of the type described hereinabove, will make possible a calorific efficiency of 90% gross on net value, whereby the clinkers are removed at ambient temperature holding only 4% unburnt matters, this when the main furnace is supplied with small unwashed coal having 32% ash content with a net B.t.u. value of 8100.

When the same main furnace and boiler were not provided with the auxiliary furnace of the present invention, the gross or net value of the calorific efficiency was only 82% when the clinkers were removed in red hot state with 14% of unburnt carbon and it could only be raised to 84.5% when the red hot clinkers were extratced with 10% unburnt matters.

It should be noted that if the pulverized firing method was used to heat the same boiler by using the same anthracite fuel, the efficiency would be of the order of 85%.

It is apparent that the illustrated and described examples have been given solely by way of illustration and not by way of limitation and that they are subject to many variations and modifications within the scope of the present invention. For example, the auxiliary furnace may have any suitable cross-section, including square or round cross-section. The extractor may be of the rotary type. All such and other variations and modifications are to be included within the scope of the present invention.

What is claimed is:

1. A process for the calorific recovery of sensible and latent heat from solid combustion residues issued from a main furnace, comprising the step of dropping said hot residues constituted by clinker and grit containing carbon at the top of an auxiliary furnace formed by the ash-pit column of said man furnace and removing cooled clinker at its bottom, maintaining a column of substantially constant height while blowing a controlled amount of air and neutral flue gas into said column to develop post-combustion therein to obtain a total recovery of all sensitive and latent calories contained in the clinkers without reaching the temperature causing the fusion of the clinkers.

2. In combination with a main furnace which produces clinkers and grit containing carbon; a vertical auxiliary furnace having an open top connected with said main furnace for receiving clinkers and grit dropped from said main furnace, means connected with said auxiliary furnace for supplying a controlled amount of air and neutral flue gas to said auxiliary furnace to develop post-combustion therein, to obtain a total recovery of all sensible and latent calories contained in the clinkers without reaching the temperature causing the fusion of the clinkers; and means located at the bottom of said auxiliary furnace for removing cooled clinkers while maintaining a substantially constant height of column thereof.

3. An auxiliary furnace in accordance with claim 2, comprising means evacuating combustion gases from the auxiliary furnace into the main furnace.

4. An auxiliary furnace in accordance with claim 2, wherein said auxiliary furnace has an upper narrower portion to increase the speed of gases flowing therethrough for the removal of soot therefrom by blowing it up with the effluent gas.

5. An auxiliary furnace in acordance with claim 2, wherein said auxiliary furnace has a lower wider portion to increase the time period of contact of the clinkers with the air in proportion needed to secure a complete post-combustion of the same.

6. An auxiliary furnace in accordance with claim 2, comprising water-jacketed walls.

7. The process in accordance with claim 1, wherein the controlled amount of air and neutral flue gas is blow at the bottom into said column.

8. The process in accordance with claim 1, wherein the controlled amount of air is blown at the bottom into said column and a controlled amount of flue gas is blown at a higher level.

9. An auxiliary furnace in accordance with claim 2, wherein the first-mentioned means supply the controlled amount of air and neutral flue gas adjacent the bottom of said furnace.

10. An auxiliary furnace in accordance with claim 2, wherein the first-mentioned means supply the controlled amount of air adjacent the bottom of said furnace while the flue gas is blown at a higher level.

References Cited by the Examiner

UNITED STATES PATENTS

| | | | |
|---|---|---|---|
| 2,029,285 | 4/1936 | Bennett | 110—165 |
| 2,087,972 | 7/1937 | Heller | 122—235 |
| 2,840,048 | 6/1958 | Schroeder | 110—165 X |
| 2,985,152 | 5/1961 | Paulison | 122—479 |

FOREIGN PATENTS

German Application, 10/1962, 1,137.821.

KENNETH W. SPRAGUE, *Primary Examiner.*